United States Patent
Koncz

(10) Patent No.: US 9,663,231 B2
(45) Date of Patent: May 30, 2017

(54) SEAT TRACK

(71) Applicant: The Boeing Company, Chicago, IL (US)

(72) Inventor: Tibor Albert Koncz, Monroe, WA (US)

(73) Assignee: The Boeing Company, Chicago, IL (US)

(*) Notice: Subject to any disclaimer, the term of this patent is extended or adjusted under 35 U.S.C. 154(b) by 57 days.

(21) Appl. No.: 14/816,447

(22) Filed: Aug. 3, 2015

(65) Prior Publication Data

US 2017/0036767 A1 Feb. 9, 2017

(51) Int. Cl.
*B64D 11/06* (2006.01)
*B64C 1/20* (2006.01)
*B64D 9/00* (2006.01)

(52) U.S. Cl.
CPC .......... *B64D 11/0696* (2013.01); *B64C 1/20* (2013.01); *B64D 9/003* (2013.01); *B64D 11/06* (2013.01)

(58) Field of Classification Search
CPC .... B64D 11/0696; B64D 9/003; B64D 11/06; B64C 1/20
USPC ..................................... 248/503.1
See application file for complete search history.

(56) References Cited

U.S. PATENT DOCUMENTS

| | | | |
|---|---|---|---|
| 1,725,439 A * | 8/1929 | Carns | B64C 3/185 244/129.1 |
| 4,776,533 A | 10/1988 | Sheek et al. | |
| 4,869,421 A * | 9/1989 | Norris | B23K 1/0014 228/181 |
| 5,178,346 A * | 1/1993 | Beroth | B64D 11/0696 244/118.1 |
| 7,100,885 B2 * | 9/2006 | Zerner | B64D 11/0696 244/117 R |
| 7,207,756 B2 * | 4/2007 | Vichniakov | B23K 20/00 410/115 |
| 7,281,685 B2 * | 10/2007 | Schoene | B64D 11/0696 244/118.6 |
| 7,370,831 B2 * | 5/2008 | Laib | B64C 1/18 174/70 B |
| 7,389,960 B2 * | 6/2008 | Mitchell | B60N 2/0224 244/118.5 |
| 7,413,143 B2 * | 8/2008 | Frantz | B64D 11/0696 244/118.6 |
| 7,506,855 B2 * | 3/2009 | Frantz | B64C 1/20 244/118.1 |
| 7,607,613 B2 * | 10/2009 | Frantz | B64D 11/0696 244/118.6 |

(Continued)

FOREIGN PATENT DOCUMENTS

DE EP 2848533 A1 * 3/2015 ......... B64D 11/0023

*Primary Examiner* — Eret McNichols
(74) *Attorney, Agent, or Firm* — Miller, Matthias & Hull LLP

(57) ABSTRACT

A titanium seat track may include a track plate formed of one of cold and hot rolled titanium. The track plate may include a top surface and a bottom surface. The titanium seat track may also include a titanium U-shaped channel formed of cold worked titanium sheet. The titanium U-shaped channel may include a first side wall and a second side wall extending from a base and terminating in a first channel edge and a second channel edge, respectively. The first channel edge and the second channel edge may be continuously welded to the bottom surface of the seat track.

20 Claims, 7 Drawing Sheets

(56) References Cited

U.S. PATENT DOCUMENTS

| | | | | |
|---|---|---|---|---|
| 7,798,447 B2* | 9/2010 | Frantz | .................. | B64C 1/20 |
| | | | | 244/118.6 |
| 8,002,507 B2* | 8/2011 | James | .................. | B64C 1/20 |
| | | | | 411/175 |
| 8,093,531 B2* | 1/2012 | Kocik | .............. | B23K 15/0006 |
| | | | | 219/121.14 |
| 8,177,184 B2 | 5/2012 | Grether et al. | | |
| 8,191,829 B2* | 6/2012 | Erickson | ................ | B64C 1/20 |
| | | | | 244/118.5 |
| 8,474,756 B2* | 7/2013 | Allain | .............. | B64D 11/0696 |
| | | | | 244/118.6 |
| 8,608,125 B2 | 12/2013 | Grether et al. | | |
| 8,701,265 B1* | 4/2014 | James | .................. | B64C 1/20 |
| | | | | 24/297 |
| 9,278,484 B2* | 3/2016 | Guzman | .............. | B29C 70/207 |
| 9,481,467 B2* | 11/2016 | Oleson | .................. | B64C 1/18 |
| 2005/0211836 A1* | 9/2005 | Frantz | .............. | B64D 11/0696 |
| | | | | 244/118.6 |
| 2015/0053838 A1* | 2/2015 | Mazidi | .............. | B64D 11/0023 |
| | | | | 248/503 |

* cited by examiner

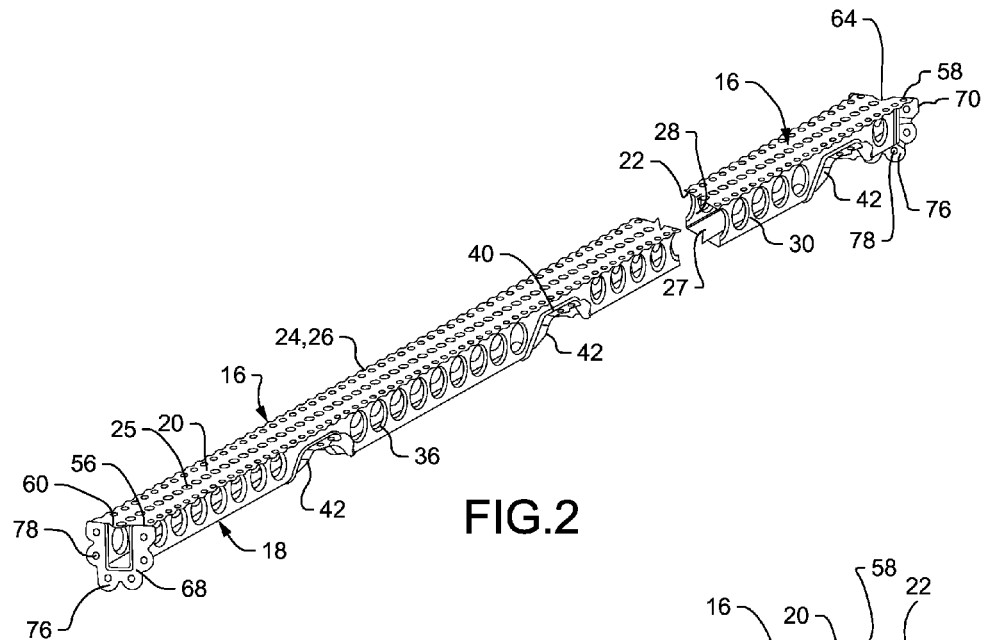

US 9,663,231 B2

SEAT TRACK

TECHNICAL FIELD

The present disclosure relates generally to a seat track and, more particularly, to a seat track for an aircraft.

BACKGROUND

Many aircraft utilize seat tracks to anchor passenger seats to the airframe of the aircraft. Due to stress loads experienced on the seat tracks, such as during aircraft flight, many traditional seat tracks are designed with thick components to support such stress loads. Although these components compensate for the loads, the thickness of the components adds weight and cost to the overall system. In some traditional seat tracks, which are extruded, the weight penalty is overcome by machining excess material in areas on the seat track where minimum loads are experienced. While effective, the machining of the extruded seat tracks is time consuming and may add costs to the manufacturing process.

Other conventional seat tracks may be manufactured from composite buildups in an effort to overcome the weight penalty issues involved with extruded seat tracks. While also effective, such designs, however, are generally costly due to the manufacturing of the numerous components from different materials, which require additional time and effort to assemble. Moreover, the assembling of the many components may present other unintended issues such as, but not limited to, welding issues, rework related to the welding issues, such as, cold fused or incomplete welded joints, and increased scrap material.

SUMMARY

In accordance with an aspect of the disclosure, a titanium seat track is provided. The titanium seat track may include a track plate formed of cold or hot rolled titanium. The track plate may include a top surface and a bottom surface wherein the top surface may be configured to retain seats of an aircraft. The titanium seat track may also include a titanium U-shaped channel formed of cold worked titanium sheet. The titanium U-shaped channel may include a first side wall and a second side wall extending from a base and terminating in a first channel edge and a second channel edge, respectively. The first channel edge and the second channel edge may be continuously welded to the bottom surface of the seat track.

In accordance with another aspect of the disclosure, a sample sequence of steps which may be practiced to fabricate a seat track and reduce weight of the seat track is provided. An illustrative step may include cold forming a channel. Another illustrative step may be machining the channel. Yet another illustrative step may be welding channel sections of the channel. Still another illustrative step may be roll forming a track plate. Still yet another illustrative step may be machining the track plate. Another illustrative step may be welding the track plate to the channel sections. Yet another illustrative step may be welding splice plates to corresponding channel section and track plate. Still another illustrative step may be providing a plurality of saddle mounts. Still yet another illustrative step may be welding the saddle mounts to respective saddle-shaped recesses. Another illustrative step may be coupling the splice plates to each other.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 2 is a perspective view an illustrative seat track, partially in section, in accordance with an embodiment of the present disclosure;

FIG. 3 is an exploded perspective view of the illustrative seat track of FIG. 2, in accordance with an embodiment of the present disclosure;

DETAILED DESCRIPTION

Figure 1:
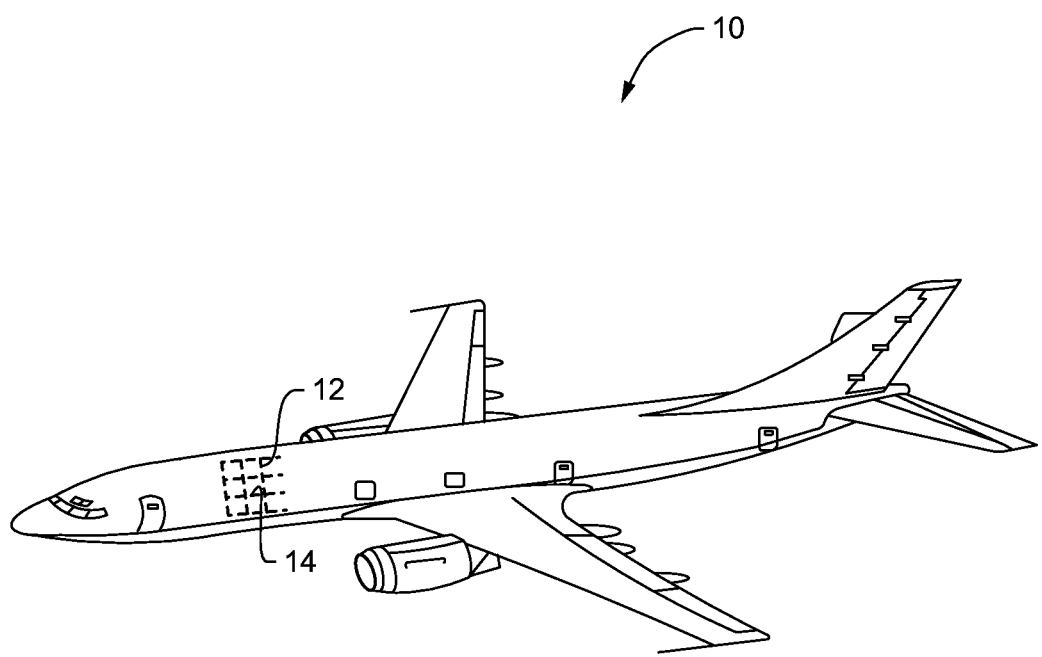
FIG. 1 is a perspective view of an illustrative aircraft, in accordance with an embodiment of the present disclosure.

Referring now to FIG. 1, an exemplary aircraft constructed in accordance with the present disclosure is generally referred to by reference numeral 10. The aircraft 10 may include an airframe 12, a portion of which is illustrated in phantom in FIG. 1, which forms the floor of the aircraft 10.

With reference to FIGS. 2 and 3, a seat track 14 may include a track plate 16 and a channel 18. The seat track 14 may be formed of a material such as titanium, however other materials may be used. More specifically, the track plate 16 may be formed of hot or cold rolled titanium. The track plate 16 may include a top surface 20 and an opposite-facing bottom surface 22 such that both the top surface 20 and the bottom surface 22 are disposed between opposite plate edges 24. The top surface 20 of the track plate 16 may be configured to retain seats (not shown) and other aircraft furnishings well known in the industry. The configuration of the top surface 20 may include, but is not limited to, a flat surface, a protruding head such as a "button head", and a recessed head. Moreover, in an embodiment, the track plate 16 may have a flat top surface 20 with a plurality of retaining apertures 25 disposed therethrough and may also include a plurality of plate notches 26 (shown in more detail in FIGS. 5 and 6), which may be disposed along the plate edges 24, for retaining the seats (not shown).

Figure 4:
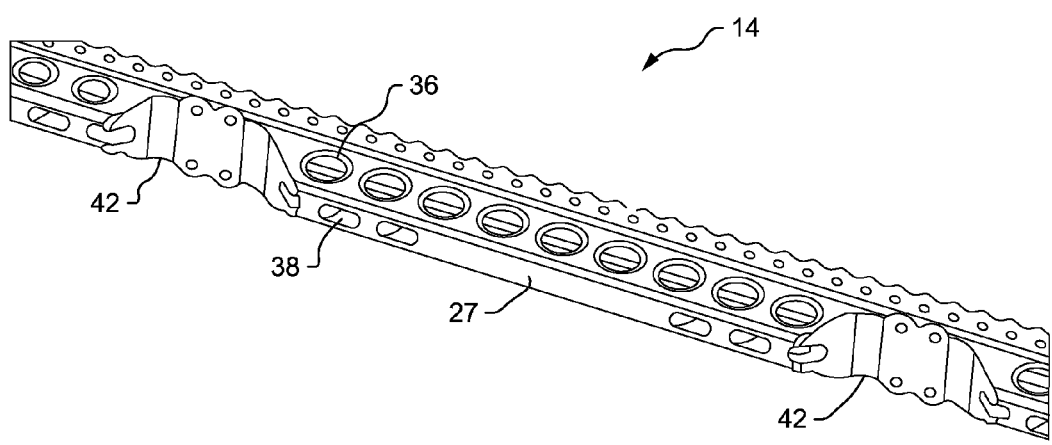
FIG. 4 is another perspective view of the illustrative seat track of FIG. 2, in accordance with an embodiment of the present disclosure.

The channel 18 may be U-shaped and may be formed of a cold worked titanium sheet. The channel 18 may include a base 27 from which opposite-facing first and second side walls 28, 30 outwardly extend and terminate in first and second channel edges 32, 34, respectively. Both the first and second side walls 28, 30 may include a plurality of stiffeners 36, which may be stiffeners that are stamped or coined into the walls 28, 30 for adding strength thereto. Moreover, the base 27 may include a plurality of weight-reducing apertures 38 (shown in FIG. 4), which may be stamped, laser cut, water jetted, or machined into the base 27 for reducing weight of the seat track 14. The channel 18 may also include a plurality of saddle-shaped recesses 40. Each saddle-shaped recess of the plurality of saddle-shaped recesses 40 may be equally spaced apart from one another. The seat track 14 may further include a plurality of saddle mounts 42 such that a selected saddle-shaped recess 40 may matingly receive a corresponding saddle mount 42 for coupling thereto. The channel 18 may be coupled to the track plate 16 such that the channel edges 32, 34 of the side walls 28, 30, respectively, may be, for example but not limited to, continuously welded, to the bottom surface 22 of the track plate 16, as will be explained in more detail below.

Figure 5:
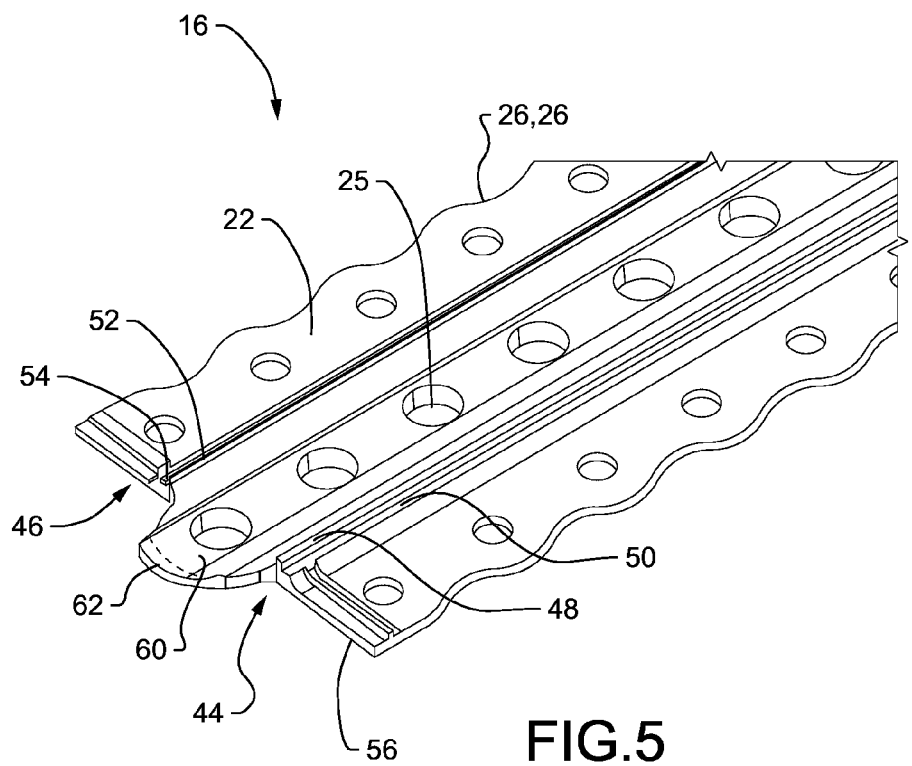
FIG. 5 is a bottom perspective view, partially in section, of an illustrative forward end of a track plate, in accordance with an embodiment of the present disclosure.

Referring to FIG. 5, the track plate 16 may include a first plate joint 44 and a second plate joint 46 both extending from the bottom surface 22. The first plate joint 44 may be spaced from the second plate joint 46. The first plate joint 44 may include a first plate ridge 48 and a first plate lip 50. Similarly, the second plate joint 46 may include a second plate ridge 52 and a second plate lip 54. The first plate ridge 48 may receive and support the first channel edge 32 of the first side wall 28 such that the first plate lip 50 may be welded to the first channel edge 32. The first plate ridge 48 is also configured to contain excess heat and molten material of the first plate lip 50 during welding. More specifically, the first plate ridge 48 may extend across the interface between the first plate lip 50 and the first channel edge 32 when the track plate 16 is positioned on the channel 18. Similarly, the second plate ridge 52 may receive and support the second channel edge 34 of the second side wall 30 such that the second plate lip 54 may be welded to the second channel edge 34. The second plate ridge 52 is also configured to contain excess heat and molten material of the second plate lip 54 during welding. Similar to the first plate ridge 48, the second plate ridge 52 may, more specifically, extend across the interface between the second plate lip 54 and the second channel edge 34 when the track plate 16 is positioned on the channel 18.

Figure 6:
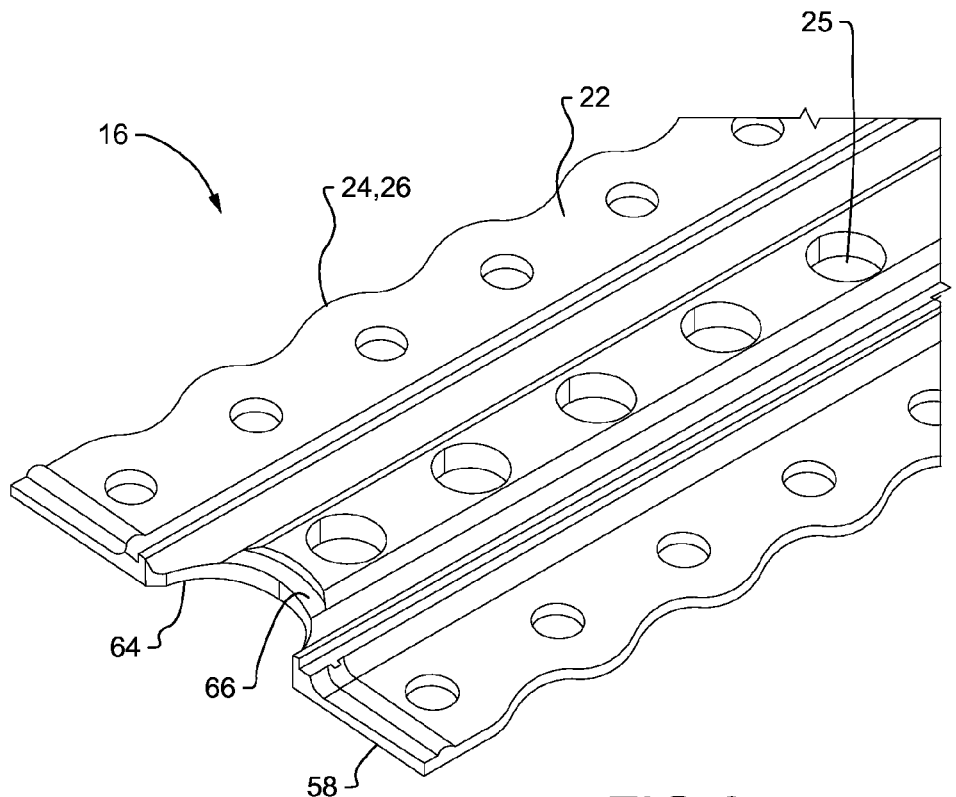
FIG. 6 is a bottom perspective view, partially in section, of an illustrative aft end of a track plate, in accordance with an embodiment of the present disclosure.

With particular reference to FIGS. 3 and 5-6, the track plate 16 includes a forward end 56 and an aft end 58. The forward end 56 may include a lug 60 that has a protruding lip 62 extending therefrom. The aft end 58 may include a recess 64 that includes a recessed lip 66. The recess 64 and the recessed lip 66 are configured to matingly receive the lug 60 and the protruding lip 62, respectively, of an adjacent track plate 16 to provide a maximum pull up load capability on the seat track 14.

Figure 7:
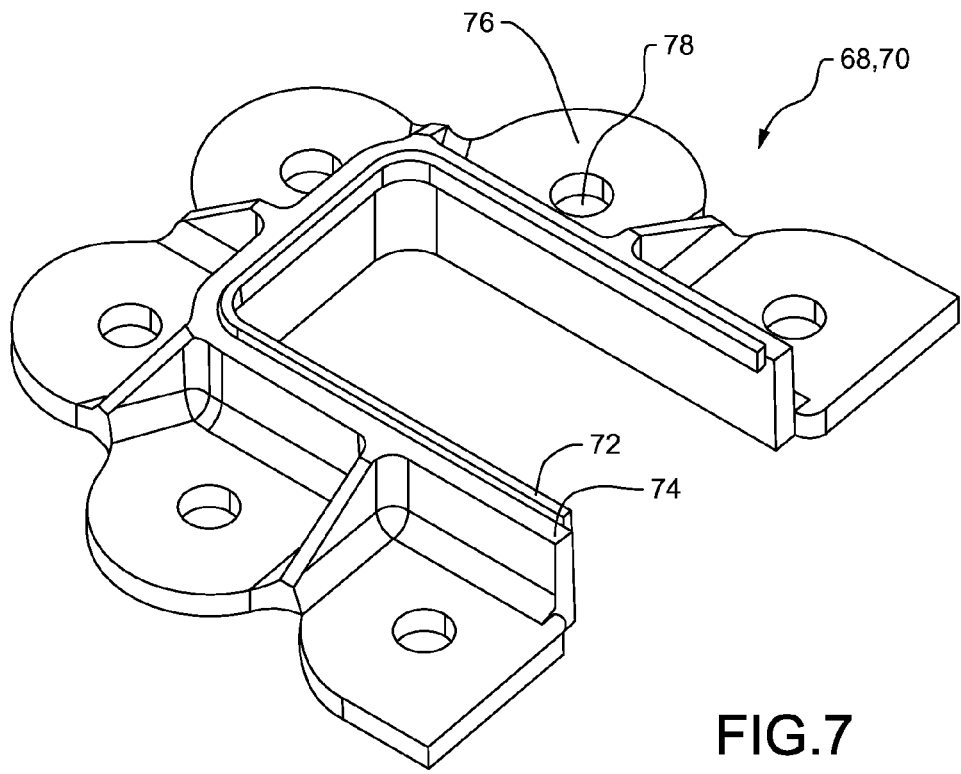
FIG. 7 is a perspective view of an illustrative splice plate, in accordance with an embodiment of the present disclosure.

As shown in FIGS. 2-3 and 7, the seat track 14 further includes a forward splice plate 68 and an aft splice plate 70. With the forward and aft splice plates 68, 70 being similarly designed to be U-shaped, it is shown in detail in FIG. 7 that the splice plates 68, 70 include a splice ridge 72 and a splice lip 74. The splice ridge 72 and the splice lip 74 may be U-shaped to correspond with the U-shape of the channel 18. Each splice plate 68, 70 may further include an array of lobes 76 along its periphery. Each lobe of the array of lobes 76 may include a fastening aperture 78. Being similarly designed, during the installation of multiple seat tracks 14 in the aircraft 10 along the length of its fuselage, adjacent seat tracks 14 may be concatenated such that the fastening apertures 78 of a forward splice plate 68 of one seat track 14 may be fastened, by any method well known in the industry such as but not limited to pins, to the fastening apertures 78 of an aft splice plate 70 of an adjacent seat track 14.

Figure 8:
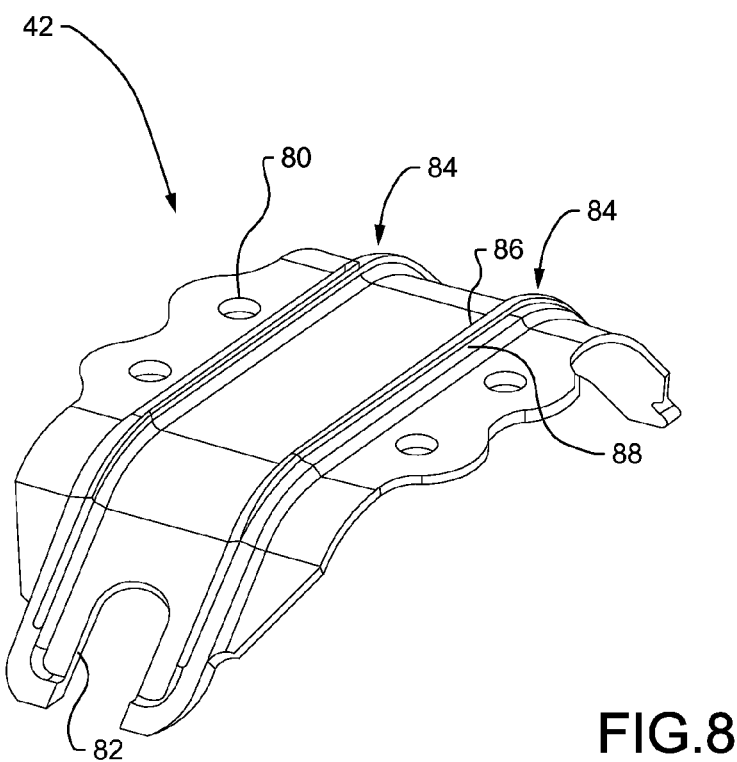
FIG. 8 is a perspective view of an illustrative saddle mount, in accordance with an embodiment of the present disclosure.

With reference to FIG. 8, each saddle mount of the plurality of saddle mounts 42 may be saddle-shaped and may include a plurality of mounting apertures 80 and a plurality of stress reliefs 82 (only one stress relief shown in FIG. 8). The plurality of mounting apertures 80 may be configured for mounting to the airframe 12 such that the mounting apertures 80 may be fastened to the airframe 12 by any method well known in the industry such as but not limited to pins. Each saddle mount of the plurality of saddle mounts 42 may also include a pair of mount joints 84. Each mount joint 84 may include a mount ridge 86 and a mount lip 88.

Referring back to FIG. 3, the channel 18 may include a plurality of channel sections. The plurality of channel sections may include, but is not limited to, a forward channel section 90, an aft channel section 92, and a plurality of mid channel sections 94 disposed between the forward channel section 90 and the aft channel section 92. Each of the channel sections 90, 92, and 94 may be dimensioned to support a preselected load and to meet required rigidity. As a non-limiting example, the forward channel section 90 and the aft channel section 92 may include a similar metal sheet gauge that is greater than a metal sheet gauge of each mid channel section of the plurality of mid channel sections 94. The forward channel section 90 may include a pair of forward ligaments 96 and the aft channel section 92 may include a pair of aft ligaments 98. Each mid channel section of the plurality of mid channel sections 94 may include a first pair of mid ligaments 100 disposed at one end and a second pair of mid ligaments 102 disposed at the opposite end. The ligaments 96, 98, 100, 102 may have a height that is less than the height of the side walls 28, 30 of the channel 18. The channel 18 may be formed as a continuous, single channel. In an alternative embodiment, each of the forward channel section 90, the aft channel section 92, and the plurality of mid channel sections 94 may be formed individually and appropriately welded to form the channel 18, as will be discussed in more detail below.

Referring back to FIG. 2, in an embodiment, consecutive adjacent saddle-shaped mounts 42 may be spaced approximately twenty-four inches from each other as measured from their center point. Moreover, the center point of the saddle mount 42 proximate the forward channel section 90 may be spaced from the forward splice plate 68 in the approximate range of 18.5 to 19.5 inches. The center point of the saddle mount 42 proximate the aft channel section 92 may be spaced from the aft splice plate 70 in the approximate range of 4.5 to 5.5 inches. In this manner, when multiple seat tracks 14 are concatenated the forward splice plate 68 of a seat track 14 and the aft splice plate 70 of an adjacent seat track 14, being fastened together, may achieve minimum bending.

Figure 9:
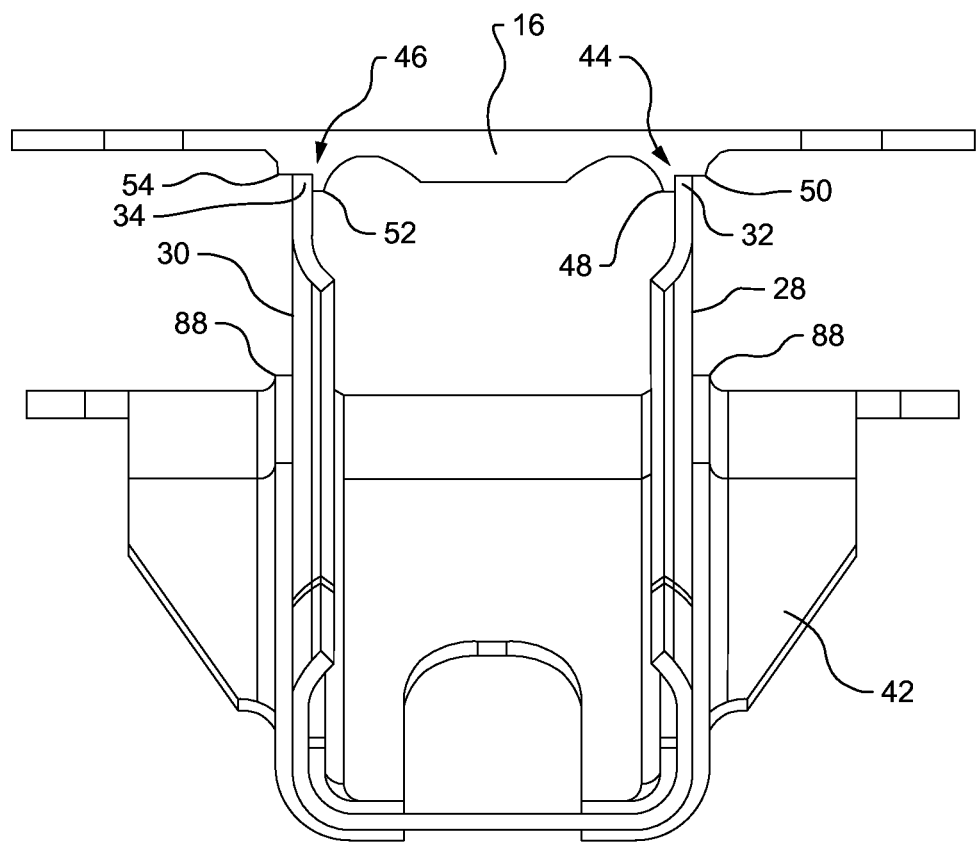
FIG. 9 is a cross-sectional view, taken along section lines 9-9 in FIG. 2, in accordance with an embodiment of the present disclosure.

Before welding, the track plate 16 may be positioned on the channel 18, as shown in FIG. 9, such that the first plate joint 44 receives the first channel edge 32 of the first side wall 28 and the second plate joint 46 receives the second channel edge 34 of the second side wall 30. As can been seen, while the first plate lip 50 receives the first channel edge 32, a portion of the first plate lip 50 may be exposed to extend outwardly beyond the first channel edge 32 such that, during welding, the first plate lip 50 melts to create a smooth transition coupling the first plate lip 50 to the first side wall 28 as the first plate ridge 48 contains excess heat and molten material of the first plate lip 50 inside the first plate joint 44. In a similar manner, during welding, the second plate lip 54 melts to create a smooth transition coupling the second plate lip 54 to the second side wall 30 as the second plate ridge 52 contains excess heat and molten material of the second plate lip 54.

The pair of mount joints 84 of each saddle mount 42 are configured similarly to the first and second plate joints 44, 46 such that, during welding of a saddle mount 42 to its selected one saddle-shaped recess 40, the mount lips 88 of the pair of mount joints 84 melt to create a smooth transition coupling the mounts lips 88 to its selected one saddle-shaped recess 40 as the mount ridges 86 contain excess heat and molten material of the mount lips 88.

Figure 10:
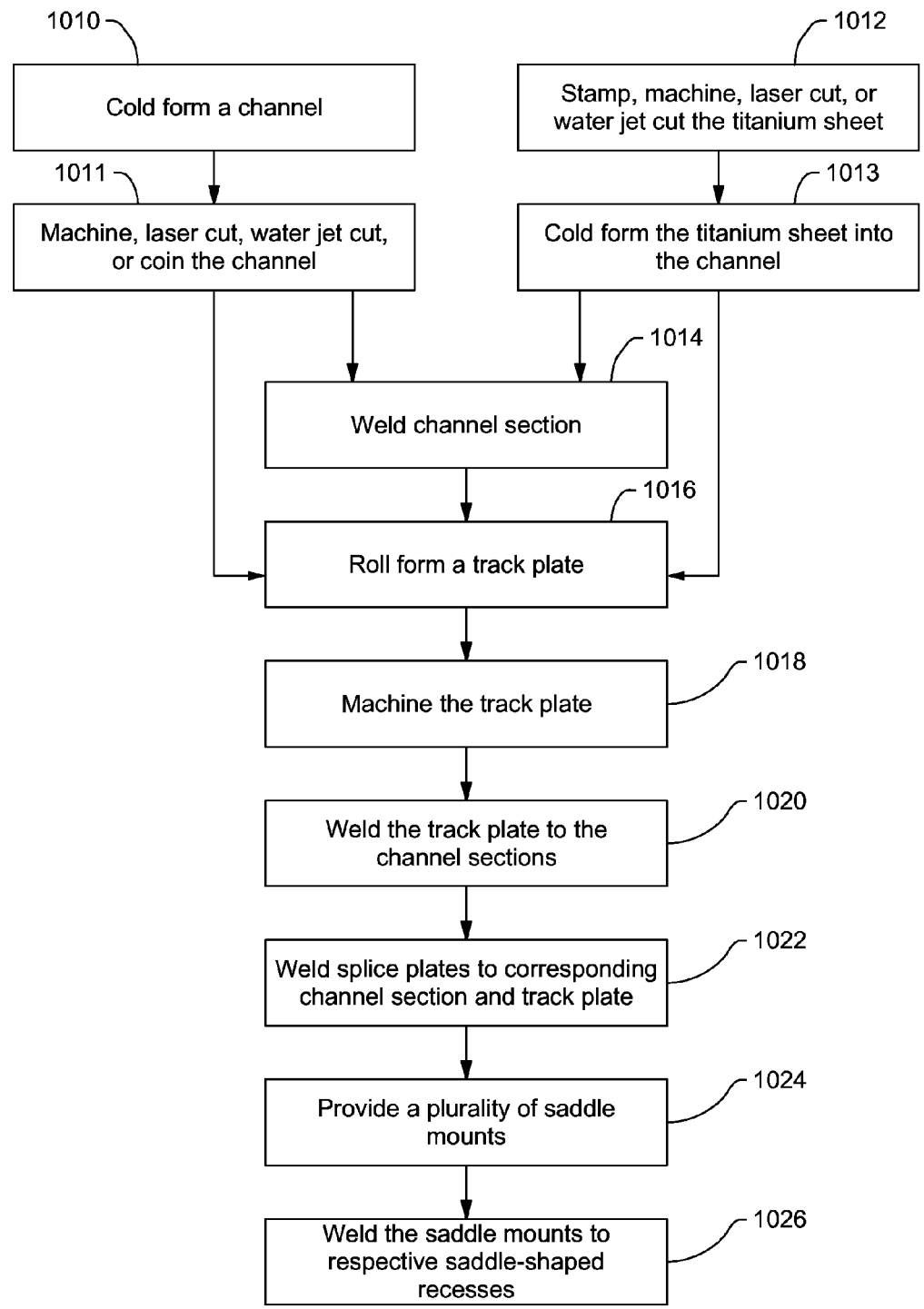
FIG. 10 is an illustration of a sample sequence of steps which may be practiced in accordance with an embodiment of the present disclosure.

FIG. 10 illustrates a sample sequence of steps which may be practiced to fabricate the seat track 14 and reduce weight of the seat track 14. Box 1010 illustrates cold forming, such as but not limited to cold roll forming, the channel 18 from a titanium sheet as a continuous channel or, alternatively, cold forming the forward channel section 90, the aft channel section 92, and the plurality of mid channel sections 94 as individual sections. As depicted in box 1011, the continuous channel 18 may be laser cut, water jet cut, or machined to include the plurality of saddle-shaped recesses 40 and the plurality of weight-reducing apertures 38 and may be coined to include the plurality of stiffeners 36.

Alternatively, as illustrated in boxes 1012 and 1013, the channel 18 may be formed by stamping, laser cutting, water jet cutting, or machining the titanium sheet to include the plurality of saddle-shaped recesses 40, the plurality of weight-reducing apertures 38, and the plurality of stiffeners 36 and cold roll formed into the continuous channel. Moreover, by virtue of stamping, laser cutting, water jet cutting, or machining the plurality of saddle-shaped recesses 40, the forward channel section 90 is stamped, laser cut, water jet cut, or machined to include the pair of forward ligaments 96, the aft channel section 92 is stamped, laser cut, water jet cut, or machined to include the pair of aft ligaments 98, and the plurality of mid channel sections 94 is stamped, laser cut, water jet cut, or machined to include the first pair of mid ligaments 100 and the second pair of mid ligaments 102. Alternatively, the forward channel section 90, the aft channel section 92, and the plurality of mid channel sections 94 may be individually stamped, laser cut, water jet cut, or machined from the titanium sheet and cold roll formed.

As illustrated in box 1014, the individual channel sections may be welded such that the first pair of mid ligaments 100 of each mid channel section of the plurality of mid channel sections 94 is welded to an adjacent second pair of mid ligaments 102 of an adjacent mid channel section with a forward-most mid channel section having its first pair of mid ligaments 100 welded to the pair of forward ligaments 96 and the aft-most mid channel section having its second pair of mid ligaments 102 welded to the pair of aft ligaments 98 collectively defining the channel 18.

Box 1016 illustrates roll forming the track plate 16 from titanium. Rolling forming may be, but is not limited to, cold roll forming or hot roll forming. As illustrated in box 1018, the track plate 16 may be machined to include the first plate joint 44 and the second plate joint 46. The first plate joint 44 may be machined to include the first plate ridge 48 and the first plate lip 50. The second plate joint 46 may be machined to include the second plate ridge 52 and the second plate lip 54. Moreover, the track plate 16 may be machined to include the plurality of plate notches 26 along the plate edges 24. The forward end 56 of the track plate 16 may also be machined to include the lug 60 and the protruding lip 62 extending therefrom. Similarly, the aft end 58 of the track plate 16 may be machined to include the recess 64 and the recessed lip 66.

Box 1020 illustrates welding the track plate 16 to the channel 18, which may include welding the first and second plate lips 50, 54 of the track plate 16 to the first and second channel edges 32, 34, respectively, of the forward, aft, and plurality of mid channel sections 90, 92, 94.

Box 1022 illustrates welding the forward splice plate 68 to the forward channel section 90 and the forward end 56 of the track plate 16. Moreover, the aft splice plate 70 may be welded to the aft channel section 92 and the aft end 58 of the track plate 16. Box 1024 illustrates providing the plurality of saddle mounts 42, which may include machining titanium into the plurality of saddle mounts 42 and then cold forming into the saddle shape. Moreover, the plurality of saddle mounts 42 may be machined to include the mount ridges 86 and mount lips 88 as well as the plurality of mounting apertures 80 and the plurality of stress reliefs 82.

As illustrated in box 1026, each saddle mount of the plurality of saddle mounts 42 may be welded to a respective saddle-shaped recess of the plurality of saddle-shaped recesses 40. For example, the mount lips 88 of one saddle mount 42 may be welded to the forward channel section 90, the pair of forward ligaments 96, the first pair of mid ligaments 100 of the forward-most mid channel section 94, and the forward-most mid channel section 94. Similarly, the mount lips 88 of another saddle mount 42 may be welded to the aft channel section 92, the pair of aft ligaments 98, the second pair of mid ligaments 102 of the aft-most mid channel section 94, and the aft-most mid channel section 94. In a similar manner, the mount lips 88 of the other saddle mounts 42 may be welded to a respective mid channel section 94, its second pair of mid ligaments 102, and an adjacent mid channel section 94 and its first pair of mid ligaments 100.

INDUSTRIAL APPLICABILITY

Based on the foregoing, it can been seen that the present disclosure sets forth a titanium seat track fabricated in a manner which may overcome previous challenges of forming and welding other metals while maintaining robustness and corrosion resistance. Furthermore, through the novel teachings set forth above, the titanium seat track of the present disclosure may provide a reduction in titanium sheet gauge in some features such as, but not limited to, the ligaments of the channel sections thereby reducing weight of the seat track while still maintaining robust stability. The teachings of this disclosure may also improve seat track fabrication through the lip and ridge joint configurations machined to the track plate, saddle mounts, and splice plate such that welding efficiency may be increased and welding issues like cold fused or incomplete welded joints may be avoided. Moreover, the teachings of the present disclosure may also be employed to simplify seat track fabrication by eliminating shimming between the saddle mounts and the channel during assembly.

What is claimed is:
1. A pre-weld seat track assembly, comprising:
a track plate formed of one of cold and hot rolled titanium, the track plate including a top surface and a bottom surface, wherein the top surface is configured to retain seats, the bottom surface including spaced first and second plate joints, the first plate joint including a first plate lip and a first plate ridge, and the second plate joint including a second plate lip and a second plate ridge; and a titanium U-shaped channel formed of cold worked titanium sheet, the titanium U-shaped channel including a first side wall and a second side wall extending outwardly from a base and terminating in a first channel edge and a second channel edge, respectively;

wherein the first channel edge and the second channel edge are configured to be received by the first plate joint and the second plate joint, respectively, so that the first plate ridge supports the first side wall and the second plate ridge supports the second side wall, the first plate ridge is sized to extend across a first interface between the first channel edge and the first plate lip, and the second plate ridge is sized to extend across a second interface between the second channel edge and the second plate lip.

2. The pre-weld seat track assembly of claim 1, further including a plurality of saddle mounts, a first and a second mount joint extends from each saddle mount of the plurality of saddle mounts, the first mount joint includes a first mount ridge and a first mount lip and the second mount joint includes a second mount ridge and a second mount lip.

3. The pre-weld seat track assembly of claim 2, wherein the channel further includes a plurality of saddle-shaped recesses, the first and the second mount joints of each saddle mount matingly received by and coupled to a selected one of the saddle-shaped recesses of the plurality of saddle-shaped recesses wherein the first and second mount ridges support the selected one of the saddle-shaped recesses, and the first and second mount lips are welded to the selected one of the saddle-shaped recesses.

4. The pre-weld seat track assembly of claim 1, wherein the U-shaped channel includes a plurality of channel sections with each section being dimensioned to support a preselected load and to meet a required rigidity.

5. The pre-weld seat track assembly of claim 4, wherein the plurality of channel sections include a forward channel section, an aft channel section, and a plurality of mid channel sections welded together such that the plurality of mid channel sections are disposed between the forward channel section and the aft channel section, the forward channel section includes a forward splice plate, and the aft channel section includes an aft splice plate.

6. The pre-weld seat track assembly of claim 5, wherein the forward splice plate includes a first splice ridge and a first splice lip, the aft splice plate includes a second splice ridge and a second splice lip, the first splice ridge supports the forward channel section, the first splice lip is welded to the forward channel section, the second splice ridge supports the aft channel section, and the second splice lip is welded to the aft channel section.

7. The pre-weld seat track assembly of claim 1, wherein the track plate includes a forward end and an aft end, the forward end includes a lug, the lug includes a protruding lip, the aft end includes a recessed lug, the recessed lug includes a recessed lip.

8. A method of fabricating a seat track, the method comprising:
cold forming a titanium channel including a first side wall, a second side wall, and a base;
one of stamping, laser cutting, water jet cutting, and machining the titanium channel to include a plurality of saddle-shaped recesses;
roll forming a titanium track plate;

machining the titanium track plate to include a first and a second plate joint, the first plate joint including a first plate ridge and a first plate lip, the second plate joint including a second plate ridge and a second plate lip;
welding the first plate lip to the first side wall such that the first plate ridge supports the first side wall and contains excess heat and molten material of the first plate lip inside the first plate joint;
welding the second plate lip to the second side wall such that the second plate ridge supports the second side wall and contains excess heat and molten material of the second plate lip inside the second plate joint;
providing a plurality of saddle mounts with each saddle mount including a first and a second mount joint; and
welding the first and the second mount joint of one of the saddle mounts of the plurality of saddle mounts to a respective saddle-shaped recess of the plurality of recesses.

9. The method of claim 8, wherein the step of cold forming the channel includes one of cold roll forming the channel and cold break forming the channel.

10. The method of claim 8, wherein the step of roll forming the track plate includes one of cold roll forming the track plate and hot roll forming the track plate.

11. The method of claim 8, further including one of coining and stamping a plurality of stiffeners into the first side wall and the second side wall.

12. The method of claim 8, further including one of stamping, laser cutting, water jet cutting, and machining a plurality of weight-reducing apertures into the base.

13. The method of claim 8, further including drilling a plurality of mounting apertures into each saddle mount of the plurality of saddle mounts.

14. A method of reducing weight of a titanium seat track, the method comprising:
cold forming a channel including a forward channel section, an aft channel section, and a plurality of mid channel sections;
one of stamping and coining a plurality of stiffeners into the forward channel section, the aft channel section, and the plurality of mid channel sections;
one of stamping, laser cutting, water jet cutting, and machining a plurality of weight-reducing apertures into the forward channel section, the aft channel section, and the plurality of mid channel sections;
one of stamping, laser cutting, water jet cutting, and machining the channel to include a plurality of saddle-shaped recesses, the forward channel section to include a pair of forward ligaments, the aft channel section to include a pair of aft ligaments, and each mid channel section of the plurality of mid channel sections to include a first pair of mid ligaments and a second pair of mid ligaments;
one of hot and cold roll forming a track plate;
machining the track plate to include a first and a second plate joint, a recessed lug including a recessed lip, and a lug including a protruding lip, the first plate joint including a first plate ridge and a first plate lip, the second plate joint including a second plate ridge and a second plate lip;
welding the first and the second plate lips to each of the forward channel section, the aft channel section, and the plurality of mid channel sections such that the first and the second plate ridges contain excess heat and molten material of the first and the second plate lips inside the first and the second plate joints, respectively;

welding a forward splice plate to the forward channel section and a forward end the track plate; and welding an aft splice plate to the aft channel section and an aft end of the aft track plate.

15. The method of claim 14, further including one of stamping, laser cutting, water jet cutting, and machining a plurality of saddle mounts such that each saddle mount includes a pair of mount joints including a mount ridge and a mount lip.

16. The method of claim 15, further including cold forming each of the saddle mounts into a saddle shape.

17. The method of claim 16, further including welding the mount lip of each saddle mount to a respective saddle-shaped recess of the plurality of saddle-shaped recesses such that the mount ridge of each saddle mount contains excess heat and molten material of the mount lip inside the pair of mount joints.

18. The method of claim 14, wherein the step of cold forming the channel includes one of cold roll forming the channel as a continuous channel, cold break forming the channel as a continuous channel, cold roll forming individually the forward channel section, the aft channel section, and the plurality of mid channel sections, and cold roll forming individually the forward channel section, the aft channel section, and the plurality of mid channel sections.

19. The method of claim 18, further including welding the pair of forward ligaments to the first pair of mid ligaments of a respective one of a mid channel section and welding the pair of aft ligaments to the second pair of mid ligaments of a respective another one of a mid channel section.

20. A titanium seat track, the seat track comprising:

a track plate formed of one of cold and hot rolled titanium, the track plate including a top surface and a bottom surface, wherein the top surface is configured to retain seats;

a titanium U-shaped channel formed of cold worked titanium sheet, the titanium U-shaped channel including a first side wall and a second side wall extending outwardly from a base and terminating in a first channel edge and a second channel edge, respectively, the first channel edge and the second channel edge being continuously welded to the bottom surface of the track plate; and a plurality of saddle mounts, a first and a second mount joint extends from each saddle mount of the plurality of saddle mounts, the first mount joint includes a first mount ridge and a first mount lip and the second mount joint includes a second mount ridge and a second mount lip.

\* \* \* \* \*